United States Patent
Heo

(10) Patent No.: US 10,403,023 B2
(45) Date of Patent: Sep. 3, 2019

(54) THREE-DIMENSIONAL CHARACTER RENDERING SYSTEM USING GENERAL PURPOSE GRAPHIC PROCESSING UNIT, AND PROCESSING METHOD THEREOF

(71) Applicant: Yoon Ju Heo, Seoul (KR)

(72) Inventor: Yoon Ju Heo, Seoul (KR)

( * ) Notice: Subject to any disclaimer, the term of this patent is extended or adjusted under 35 U.S.C. 154(b) by 0 days.

(21) Appl. No.: 15/550,060

(22) PCT Filed: Oct. 15, 2015

(86) PCT No.: PCT/KR2015/010872
§ 371 (c)(1),
(2) Date: Aug. 10, 2017

(87) PCT Pub. No.: WO2016/137080
PCT Pub. Date: Sep. 1, 2016

(65) Prior Publication Data
US 2018/0047204 A1  Feb. 15, 2018

(30) Foreign Application Priority Data

Feb. 27, 2015  (KR) .......................... 10-2015-0028005

(51) Int. Cl.
*G06T 15/00* (2011.01)
*G06T 15/55* (2011.01)
(Continued)

(52) U.S. Cl.
CPC ............ *G06T 15/005* (2013.01); *G06T 15/04* (2013.01); *G06T 15/506* (2013.01); *G06T 15/55* (2013.01);
(Continued)

(58) Field of Classification Search
CPC ......... G06T 1/20; G06T 13/40; G06T 15/005; G06T 15/50–80
See application file for complete search history.

(56) References Cited

U.S. PATENT DOCUMENTS

| 2009/0198972 A1* | 8/2009 | Nystad | G06F 9/383 |
| | | | 712/220 |
| 2011/0316864 A1* | 12/2011 | Mejdrich | G06T 1/20 |
| | | | 345/506 |

(Continued)

FOREIGN PATENT DOCUMENTS

| KR | 10-2008-0050284 | 6/2008 |
| KR | 10-2009-0061177 | 6/2009 |
| KR | 10-2010-0062860 | 6/2010 |

OTHER PUBLICATIONS

D'Eon, Eugene et al., GPU Gems 3, Part III: Rendering, Chapter 14. Advanced Techniques for Realistic Real-Time Skin Rendering [Online] Dec. 2007, Retrieved from the Internet: <URL: http://developer.nvidia.com/GPUGems3/gpugems3_ch14.html>.

(Continued)

*Primary Examiner* — Charles Tseng
(74) *Attorney, Agent, or Firm* — Lex IP Meister, PLLC

(57) ABSTRACT

The present invention relates to a system for rendering a three dimensional character and a method for processing thereof. The system for rendering a three dimensional character renders a three dimensional character model, for example, a skin having a multilayered structure such as a face of the person to enable realistic skin expressions according to reflection and scattering of light using a GPGPU. To this end, the system for rendering a three dimensional character includes a plurality of GPGPU modules corresponding to a render pass. According to the present invention, an irradiance texture of an image for each layer of the skin is created and processed using the GPGPU without passing through a render pass of a rendering library, thereby reducing a load of the system for rendering and enabling realistic skin expressions in real time.

4 Claims, 8 Drawing Sheets

(51) Int. Cl.
*G06T 15/80* (2011.01)
*G06T 19/20* (2011.01)
*G06T 15/04* (2011.01)
*G06T 15/50* (2011.01)

(52) U.S. Cl.
CPC .............. *G06T 15/80* (2013.01); *G06T 19/20* (2013.01); *G06T 2215/16* (2013.01)

(56) References Cited

U.S. PATENT DOCUMENTS

2013/0063440 A1* 3/2013 Son ...................... G06T 15/005
 345/426
2014/0327690 A1* 11/2014 McGuire ............... A63F 13/355
 345/589

OTHER PUBLICATIONS

Seo, Myoung Kook et al., "Rendering of Time-varying Human Skin", Proceedings of the Society of CAD/CAM Conference, Jan. 2013, pp. 23-30.

* cited by examiner

[FIG. 1]
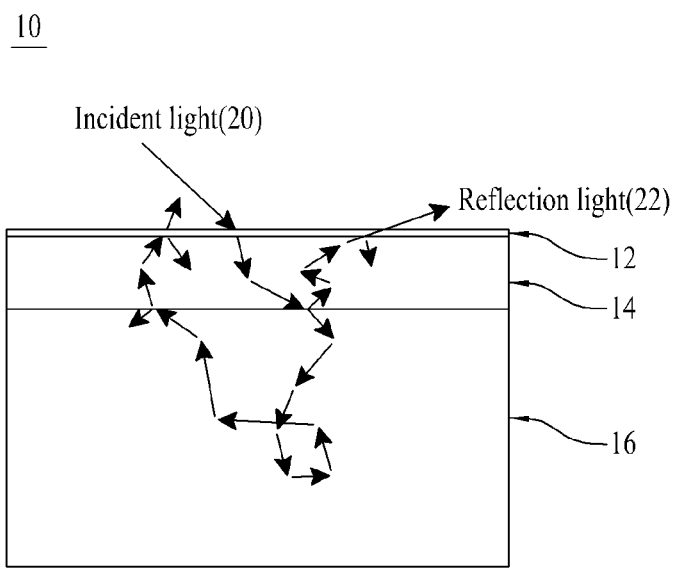

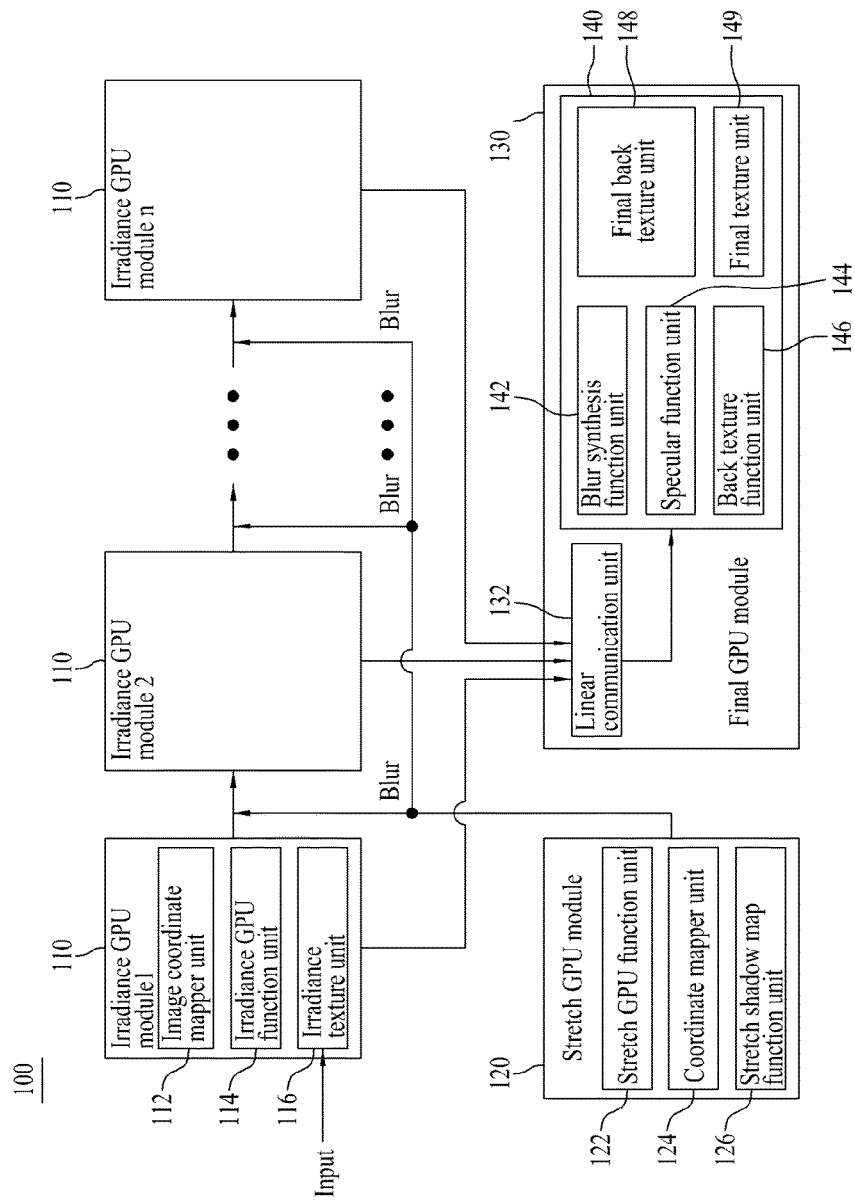
[FIG. 2]

[FIG. 3]
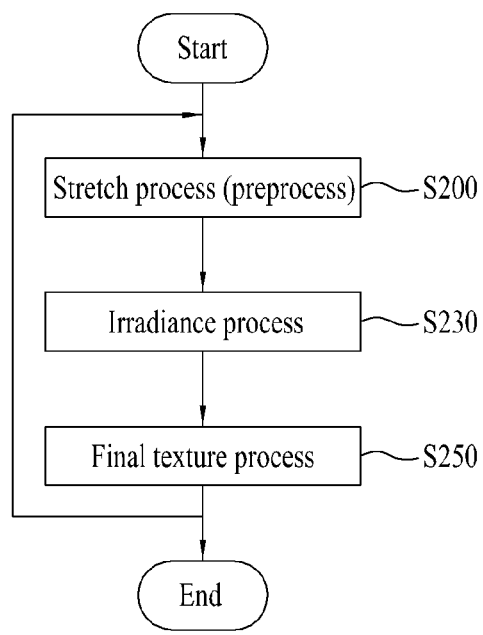

[FIG. 4]
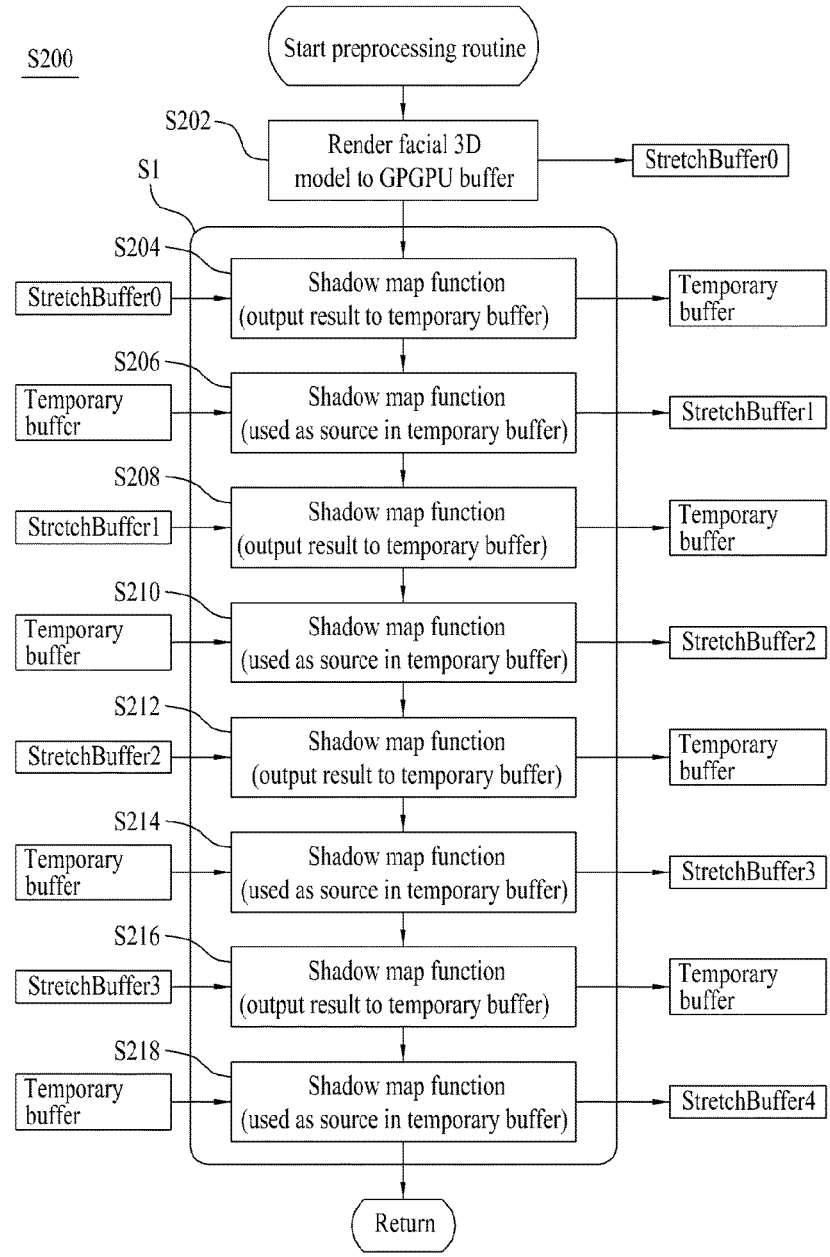

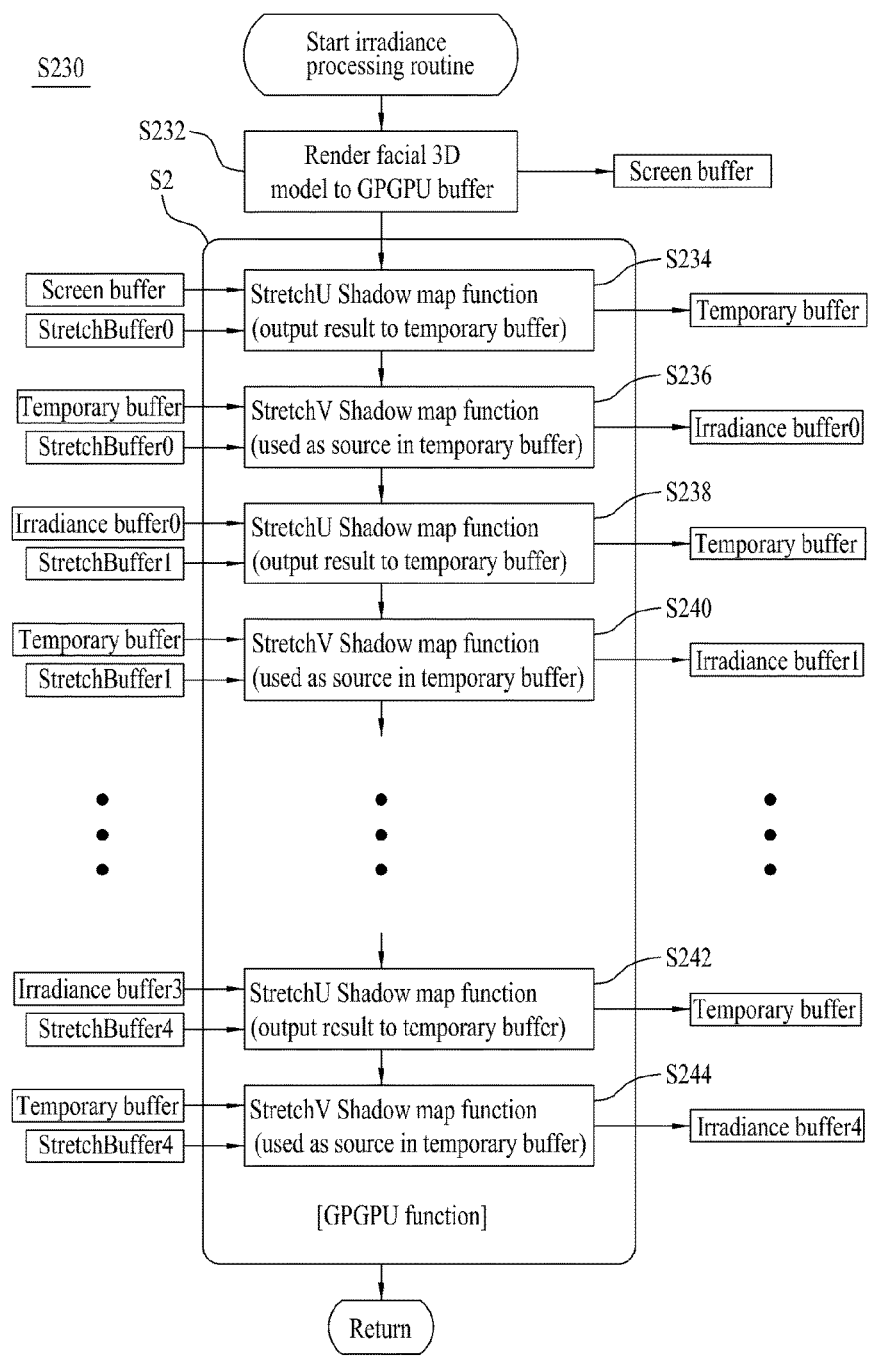
[FIG. 5]

[FIG. 6]
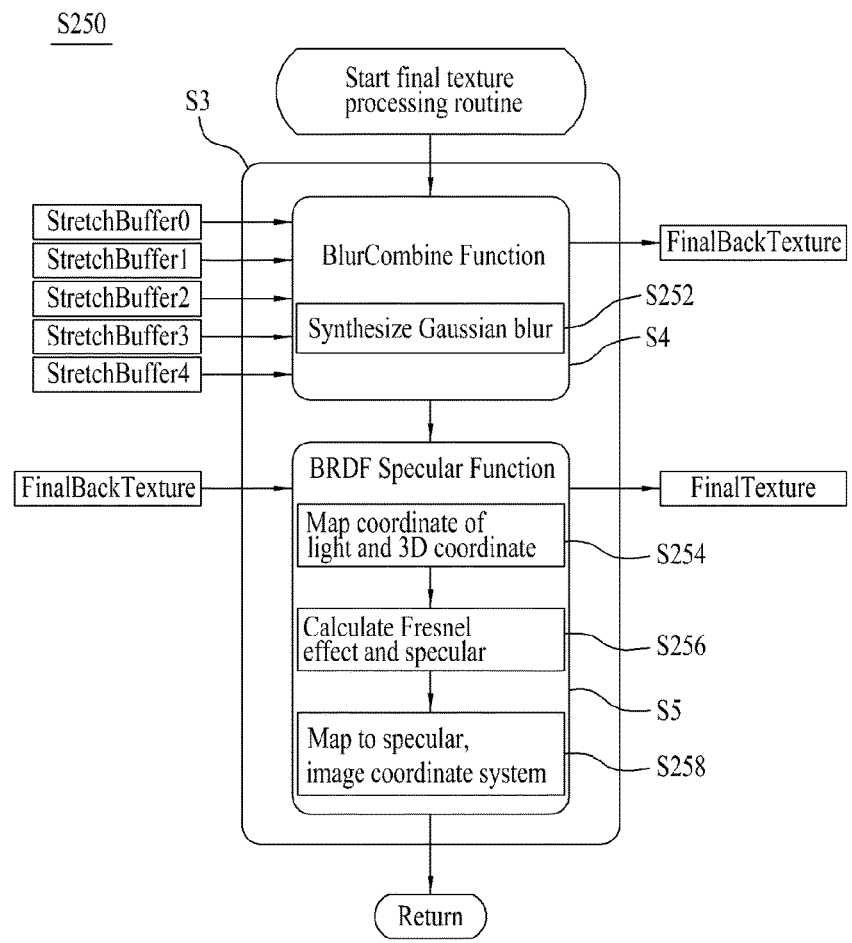

[FIG. 7]
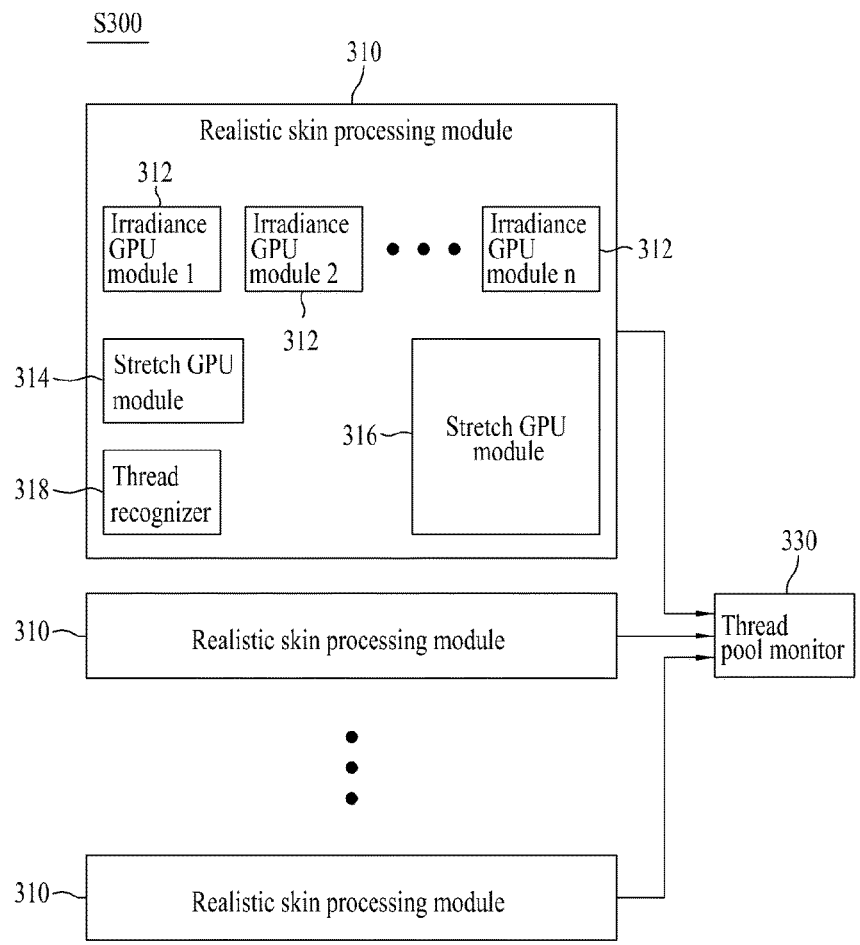

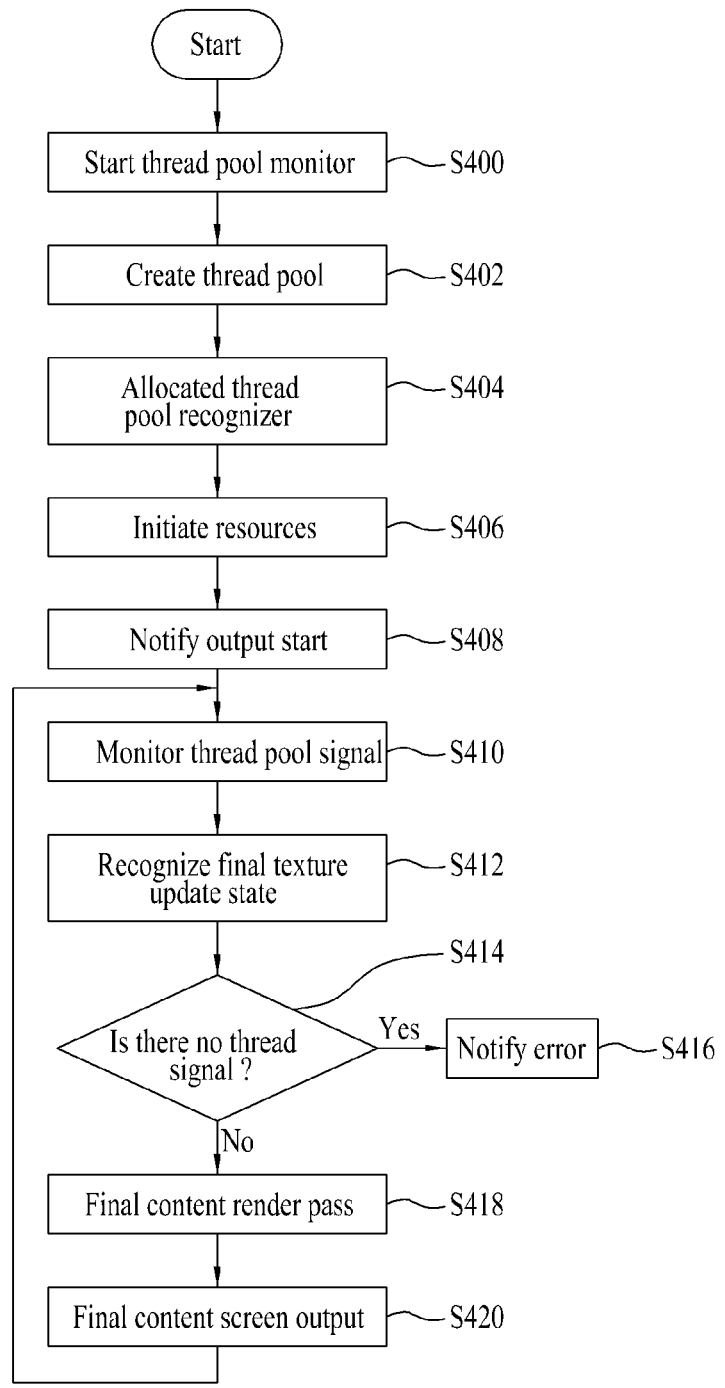
[FIG. 8]

THREE-DIMENSIONAL CHARACTER RENDERING SYSTEM USING GENERAL PURPOSE GRAPHIC PROCESSING UNIT, AND PROCESSING METHOD THEREOF

TECHNICAL FIELD

The present invention relates to system for rendering of a three-dimensional character, and more particularly, to a system for rendering of a three-dimensional character for processing realistic facial expressions of a three-dimensional character in real time using a general purpose graphic processing unit (GPGPU) and a method for processing thereof.

Further, the present invention relates to a system for rendering of a three-dimensional character for parallel-processing realistic facial expressions of a plurality of three-dimensional characters in real time using a general purpose graphic processing unit (GPGPU) and a method for processing thereof.

BACKGROUND ART

In recent years, realistic expression of materials has become an important factor in movies, games, and animation, and various techniques for realistic expression have been developed. However, it takes a lot of time to utilize various techniques, and the cost of utilizing various techniques also increases.

Especially, in the case of a material in which light is reflected and diffused, such as the human skin, the realistic expression is not achieved. In other words, it is very difficult to reproduce human faces more realistically in computer graphics because the multi-layered skin absorbs and scatters light differently at each layer.

Currently, with the development of a 3D scanning technology, it is possible to model the 3D character at a level similar to the real face. In addition, for more realistic expression of the real face according to the development of the infrastructure, a method of applying the physical scattering effect of light to a real human face has been developed. The method uses a method of dividing the skin into several layers and applying reflection and diffusion of light according to the divided layers.

For example, a bidirectional reflectance distribution function (BRDF) method is used to express light dispersion according to a human skin layer using a three-dimensional engine of computer graphics. The BRDF method is mainly applied to the expression of specular, and then the diffuse effect through a diffusion profile is calculated in the lower skin layer.

Referring to FIG. 1, layers of the real human skin 10 is divided into an oil layer 12, an epidermis 14, and a dermis 16. Incident light 20 incident to the skin 10 is reflected at the oil layer 12, that is, the surface of the skin layer 10 from the light source (not illustrated) and generate reflected light 22 or scattered by the inside of the skin 10, that is, the epidermis 14 and the dermis 16.

Rendering for realistic skin expression means a technique for expressing the physical diffusion and dispersion effects of light sources according to each layer of the skin on a three-dimensional screen and expressing a real skin to which a physical concept is applied in real time. The rendering means a process of creating a three-dimensional image by injecting a sense of reality into a two-dimensional image by considering external information such as a light source, a position, and a color.

Since the oil layer 12 is finely rough on the surface of the skin, the reflection by the oil layer of the skin is not a reflection of a mirror. The oil layer 12 has an incident angle and an angle of reflection, and uses a bi-directional reflection distribution function (BRDF) scheme for expressing the oil layer. This is applied in a shader function in a specular form from the last render pass of the rendering.

In order to process a light scattering effect in the epidermis 14 and the dermis 16, a technique for expressing a physical scattering called a diffusion profile is applied by creating a plurality of irradiance textures. The diffusion profile is a method of estimating scattering of the light when the light is diffused below the semi-transparent surface having a high scattering degree. For example, the diffusion profile is a function of a distance and an angle from the center of the light and notifies how much light is emitted. This diffusion profile is very dependent on the color. For example, red is scattered farther than green and blue. Scholars have implemented a spectral model that theoretically simulates 150 color areas on the skin. However, this is not realistic because of being subjected to many render passes in reality, and generally, rendering is performed through RGB light diffusion.

This diffusion profile needs to create irradiance textures sequentially in accordance with the characteristics of an algorithm, and in the final rendering step, the skin is realistically expressed by a method of synthesizing the irradiance textures by applying a gaussian filter. That is, in the method of dividing the skin layer and applying each physical diffusion profile, a plurality of irradiance textures to be expressed are created, and the gaussian filter is applied and a linear combination method is used. In this process, the irradiance-related textures need to be created sequentially and linearly. For this reason, a lot of time is invested in the creation and change of the irradiance textures, and there is a limit to the fast rendering, and thus, there is a limit to the creation by a parallel process. Further, during this complex processing, especially in the process of creating the plurality of irradiance textures and filling information, a load is generated.

Therefore, it is almost impossible to express the realistic skin for the three dimensional characters in real time using the BRDF method.

Further, in order to reduce the load caused by the realistic skin expression of the three dimensional characters, a level of detail (LOD) technique is used or a method of reducing the irradiance processing step is used. However, in such a method, the expressed three dimensional characters are also expressed by a similar skin texture rather than the realistic skin. In addition, when a plurality of face characters is realistically expressed in one content, there is a problem in the processing speed, and thus, the load problem becomes more remarkable.

DISCLOSURE

Technical Problem

An object of the present invention is to provide a system for rendering of a three-dimensional character for processing realistic facial expressions of a three-dimensional character in real time using a general purpose graphic processing unit for extreme realistic expression of the three-dimensional character and a method for processing thereof.

Another object of the present invention is to provide a system for rendering of a three-dimensional character for parallel-processing realistic facial expressions of a plurality of three-dimensional characters in real time using a general purpose graphic processing unit and a method for processing thereof.

Technical Solution

In order to achieve the objects, the system for rendering of the three-dimensional character of the present invention has a feature that the image for each layer of the facial skin of the three dimensional character is rendered using a GPGPU. The system for rendering of the three-dimensional character of the present invention renders the three-dimensional character in real time using the GPGPU, thereby enabling realistic skin expressions of the three-dimensional character in real time and parallel-processing the realistic skin expressions of the plurality of three-dimensional characters included in contents.

According to the features, a system for rendering a three-dimensional character of the present invention includes a plurality of irradiance GPU modules that create irradiance textures for each step according to a skin layer in a three-dimensional character model to sequentially blur-process the created irradiance textures; a stretch GPU module that creates image data stretched by mapping a screen coordinate and an image coordinate and creates a stretch shadow map by pre-processing to preprocess the irradiance texture to be blurred in each irradiance GPU module; and a final GPU module that receives the blurred irradiance textures from the irradiance GPU modules and linearly combines the irradiance textures with each other, and sequentially processes a blur synthesis function, a specular function, and a back texture copy to create and output a final texture, in which each of the irradiance GPU modules, the stretch GPU module, and the final GPU module is included in a general purpose graphic processing unit (GPGPU) module.

In one embodiment of the feature, the irradiance GPU module includes: an irradiance texture unit that creates and stores the irradiance texture for the three-dimensional character; an image coordinate mapper unit that maps an image coordinate to the created irradiance texture coordinate, and an irradiance processing function unit that blur-processes the mapped irradiance texture using a Gaussian Kernel.

In another embodiment, the stretch GPU module includes: a stretch GPU function unit that stretch-processes each texture in a U-axial or V-axial direction; a coordinate mapper unit that maps the screen coordinate and the image coordinates of the stretch U image data and the stretch V image data; and a stretch shadow map function unit that creates a stretch U shadow map and a stretch V shadow map, which are resources of the GPGPU module.

In yet another embodiment, the final GPU module includes: a linear combination unit that receives the blurred irradiance textures from the irradiance GPU modules to linearly combine the irradiance textures with each other; and final GPU function unit that sequentially processes a blur synthesis function, a specular function, and a back texture copy of the irradiance textures linearly combined from the linear combination unit to generate a final back texture and generates a final texture from the final back texture to output the final texture.

According to another feature of the present invention, provided is a method for rendering a three-dimensional character.

The method for rendering a three-dimensional character according to the feature includes: a preprocessing step of stretching a texture from an image for each step according to a skin layer of a three-dimensional character by using a GPGPU module; an irradiance processing step of creating and processing the irradiance texture from the image for each step by using the GPGPU module; and a final processing step of creating a final texture expressed with a realistic skin from the irradiance texture by using the GPGPU module to output the final texture in real time.

In an embodiment of the feature, the preprocessing step includes: rendering a facial image texture of the three-dimensional character to a stretch buffer of the GPGPU module; and repetitively processing a stretch U processing function and a stretch V processing function many times by using a stretch buffer and a temporary buffer of the GPGPU module to output a texture stretched in U-axial and V-axial directions.

In another embodiment, the irradiance processing step includes: rendering a facial image texture of the three-dimensional character to a screen buffer of the GPGPU module; and repetitively processing an irradiance processing function and a stretch shadow processing function by using a temporary buffer, a stretch buffer, and an irradiance buffer of the GPGPU module to create and process an irradiance image for each step.

In yet another embodiment, the final processing step includes: receiving the irradiance image for each step processed in the irradiance processing step to linearly combine the irradiance images with each other; processing a blur synthesis function by applying gaussian blur to create a final back texture; calculating a specular by three-dimensionally mapping the final back texture to a coordinate of light by using a specular function; and creating and outputting a final texture expressed with the realistic skin by mapping the specular and the image coordinate system.

According to yet another feature of the present invention, provided is a system for rendering three-dimensional characters that parallel-processes rendering for a plurality of three-dimensional characters.

The system for rendering three-dimensional characters that parallel-processes rendering for a plurality of three-dimensional characters of the present invention according to the feature includes: a plurality of realistic skin processing modules that renders images for the skin of each of the plurality of three-dimensional characters included in the contents using a GPGPU, has a thread recognizer for recognizing a thread pool, and processes the thread pool; and a thread pool monitor that recognizes the thread recognizer from the realistic skin processing modules to manage a thread pool for the realistic skin processing modules.

In an embodiment of the feature, the realistic skin processing module includes: a plurality of irradiance GPU modules that create irradiance textures for each step according to a skin layer in a three-dimensional character model to sequentially blur-process the created irradiance textures; a stretch GPU module that creates image data stretched by mapping a screen coordinate and an image coordinate and creates a stretch shadow map by pre-processing to preprocess the irradiance texture to be blurred in each irradiance GPU module; and a final GPU module that receives the blurred irradiance textures from the irradiance GPU modules and linearly combines the irradiance textures with each other, and sequentially processes a blur synthesis function, a specular function, and a back texture copy to create and output a final texture.

In another embodiment, the thread pool monitor detects a response from the GPGPU function for each character processed by each of the realistic skin processing modules and determines that the realistic skin processing modules may not be applied and operated when there is a limit value that the realistic skin processing module for the realistic skin is no longer allocated to notify the situation to the application.

According to still another feature of the present invention, provided is a method for processing a system for rendering a three-dimensional character.

The method for processing a system for rendering a three-dimensional character of the present invention according to the feature includes: creating a thread pool for each of a plurality of realistic skin processing modules by activating a thread pool monitor of the system for rendering a three-dimensional character; allocating a thread recognizer for each of the realistic skin processing modules; initializing resources of the realistic skin processing modules; notifying, by the thread pool monitor, output starting to the thread of the realistic skin processing modules; monitoring, by the thread pool monitor, a thread pool signal for each of the realistic skin processing modules; recognizing, by the thread pool monitor, an update state for the final texture of each of the realistic skin processing modules; determining, by the thread pool monitor, the presence or absence of a thread signal from each of the realistic skin processing modules in order to determine the normal operation state of the realistic skin processing module; and as the determining result, if there is the thread signal, processing and outputting a render pass of the final content.

The method further includes notifying to the application that an error occurs if there is no thread signal as the determining result.

Advantageous Effects

As described above, in order to express the realistic skin of the three-dimensional character, the system for rendering the three-dimensional character of the present invention creates and processes a irradiance texture of a distributed image for each layer of the skin using the GPGPU such as a computer unified device architecture (CUDA) without passing through a render pass of a rendering library such as DirectX or OpenGL, thereby reducing a load of the system for rendering and enabling realistic skin expressions in real time.

Further, by using the GPGPU, it is possible to reduce the render pass and use a GPGPU function rather than a shader function, thereby enabling realistic expression processing of the characters in a faster real time in various character-based contents.

Further, by parallel-processing the realistic skin expressions for the plurality of characters included in the contents, it is possible to more rapidly utilize the realistic skin expressions of a plurality of characters to a wider range of contents and greatly influence the development of the character-related industry.

DESCRIPTION OF DRAWINGS

FIG. 1 is a diagram illustrating reflection and diffusion states of light according to a skin layer of a real person;

FIG. 2 is a block diagram illustrating a configuration of a system for rendering a three-dimensional character that processes rendering for realistic skin expressions of the three-dimensional character according to the present invention;

FIG. 3 is a flowchart illustrating a realistic skin rendering processing procedure of the three-dimensional character according to the present invention;

FIG. 4 is a flowchart illustrating a processing procedure of a preprocessing routine illustrated in FIG. 3;

FIG. 5 is a flowchart illustrating a processing procedure of an irradiance processing routine illustrated in FIG. 3;

FIG. 6 is a flowchart illustrating a processing procedure of a final processing routine illustrated in FIG. 3;

FIG. 7 is a block diagram illustrating a configuration of a system for rendering a three-dimensional character by a parallel processing method according to another exemplary embodiment of the present invention; and FIG. 8 is a flowchart illustrating a processing procedure of realistic skin rendering of a three-dimensional character by a parallel processing method according to another exemplary embodiment of the present invention.

MODES OF THE INVENTION

Exemplary embodiments of the present invention may be modified in various forms, and the scope of the present invention is not interpreted as being limited to the exemplary embodiments below described in detail. Examples of the present invention will be provided for more completely describing the present invention to those skilled in the art. Accordingly, shapes and the like of the components in the drawings are exaggerated in order to emphasize a clear description.

Hereinafter, an exemplary embodiment of the present invention will be described in detail with reference to the accompanying FIGS. 2 to 8.

FIG. 2 is a block diagram illustrating a configuration of a system for rendering a three-dimensional character that processes rendering for realistic facial expressions of the three-dimensional character according to the present invention.

Referring to FIG. 2, a system 100 for rendering a three-dimensional character of the present invention renders an image for the facial skin of a three-dimensional character using a general purpose graphic processing unit (GPGPU) in order to express the realistic skin of the three-dimensional character in real time.

Accordingly, in order to express the realistic skin of the three-dimensional character, the system 100 for rendering the three-dimensional character of the present invention creates and processes a irradiance texture of a distributed image for each layer of the skin using the GPGPU such as a computer unified device architecture (CUDA) without passing through a render pass of a rendering library such as DirectX or OpenGL.

To this end, in the present invention, the irradiance texture needs to interlock with the GPGPU and a GPGPU function for an image processing of the irradiance texture is required. That is, the irradiance texture pass has a processing structure in which a function of a shader in the render pass is handled by a GPGPU function. In this case, the shader function is handled by the GPGPU function to express rapidly and precisely a processing process related with rendering.

Further, the present invention applies a structure for a real-time processing more quickly by generating texture resources such as a texture for irradiance processing to interlock with the GPGPU. As such, an improved rendering speed is provided when applied to games, animations, and other diverse contents by enabling the irradiance processing in the GPGPU without the render pass.

Particularly, the system 100 for rendering the three-dimensional character of the present invention includes a plurality of irradiance GPU modules 110, a stretch GPU module 120, and a final GPU module 130. Each of the plurality of irradiance GPU modules 110, the stretch GPU module 120, and the final GPU modules 130 is provided as a GPGPU module for interlocking the irradiance texture.

The irradiance GPU module 110 includes an irradiance texture unit 116 that creates and stores the irradiance texture for the three-dimensional character, an image coordinate mapper unit 112 that maps an image coordinate to the created irradiance texture coordinate, and an irradiance processing function unit 114 that blur-processes the mapped irradiance texture. The irradiance processing function unit 114 includes a gaussian Kernel U blur function that processes a U-axial directional blur and a gaussian Kernel V blur function that processes a V-axial directional blur.

Here, the irradiance texture is created by obtaining an irradiance texture corresponding to each polygon constituting the three-dimensional character from an optimal stretch image and the created irradiance texture is stored in the irradiance texture unit 116. At this time, when the image coordinate mapper unit 112 maps the image coordinates to the irradiance texture coordinate, a blur occurs in a part thereof. Thus, the irradiance processing function unit 114 blur-processes the mapped irradiance texture through each function. The blur-processed irradiance texture is stored in the irradiance texture unit 116 to control finally the irradiance using the gaussian Kernel.

The irradiance GPU module 110 processes acquiring and mapping the texture of the three-dimensional character based on a graphic processing unit (GPU) without creating the texture map. Accordingly, the plurality of irradiance GPU modules 110 process each irradiance texture by sequentially processing the aforementioned processes. At this time, the irradiance texture output from each irradiance GPU module 110 is blurred in the pre-processing module, that is, the stretch GPU module 120.

The irradiance GPU module 110 processes the blur in the U-axis direction for the gaussian kernel on the basis of a stretch U shadow map and processes the blur in the V-axis direction for the gaussian kernel on the basis of a stretch V shadow map. Accordingly, the irradiance GPU module 110 creates stepwise irradiance image data in the texture data interlocked with the GPGPU module.

The stretch GPU module 120 is a preprocessing module and creates stretch U image data and stretch V image data that have been stretched in the U and V axis directions and creates a stretch U shadow map and a stretch V shadow map by preprocessing. The stretch U image data and the stretch V image data is created by mapping a screen coordinate and an image coordinate by the stretch GPU module 120. Further, the stretch GPU module 120 processes an operation for the stretch U texture and stretch V texture data interlocked with the GPGPU module.

In the exemplary embodiment, the stretch GPU module 120 is provided with a stretch U GPU module for stretching in the U-axis direction and a stretch V processing module for stretching in the V-axis direction.

Each stretch GPU module 120 includes a stretch GPU function unit 122, a coordinate mapper unit 124, and a stretch shadow function unit 126. The stretch GPU function unit 122 of each stretch GPU module 120 includes a stretch U function unit or a stretch V function unit.

The stretch GPU function unit 122 stretch-processes each texture in a U-axial or V-axial direction. The coordinate mapper unit 124 maps the screen coordinate and the image coordinates of the stretch U image data and the stretch V image data.

In addition, the stretch shadow map function unit 126 creates a stretch U shadow map and a stretch V shadow map, which are resources of the GPGPU. Each stretch shadow map function unit 126 includes a stretch U shadow map function unit or a stretch V shadow map function unit. The stretch U shadow map function unit and the stretch V shadow map function unit separate the stretch U shadow map and the stretch V shadow map from each other in order to process the distortion in the process of mapping in the 3D space from the texture mapping, respectively.

Alternatively, although not illustrated, the stretch GPU module 120 includes a temporary buffer and a stretch buffer. A temporary U blur buffer is allocated to the GPGPU and used as a temporary texture buffer for the blur kernel for U stretching, and a V blur buffer is allocated to the GPGPU and used for a texture buffer for the blur kernel, and a gaussian blur of the final pass.

Accordingly, the stretch GPU module 120 preprocesses the irradiance texture processed in each irradiance GPU module 110 to be blurred.

In addition, the final GPU module 130 includes a linear combination unit 132 and a final GPU function unit 140. The final GPU function unit 140 includes a blur synthesis function unit 142 for processing a blur synthesis function, a specular function unit 144 for processing a specular function, a back texture copy unit 146 for copying a back texture, a final back texture unit 148 for creating a final back texture, and a final texture unit 149 for creating a final texture and outputting the created final texture to the screen.

The final GPU module 130 receives the blurred irradiance textures from the irradiance GPU modules 110 and linearly combines the blurred irradiance textures by the linear combination unit 132. The final GPU function unit 140 sequentially processes the blur synthesis function, the specular function, and the back texture copy of the irradiance textures linearly combined by the linear combination unit 132 to create a final back texture and creates and output the final back texture as the final texture.

The final GPU module 130 applies a gaussian blur to the irradiance image data in each step with the GPGPU function to exhibit a diffusion profile effect. Further, the final GPU module 130 also maps the effects on the BRDF specular to the final result image. In addition, the final GPU module 130 also processes an operation for the final texture data interlocked with the GPGPU. Accordingly, the final GPU module 130 creates a texture on the GPGPU expressing the final realistic skin and outputs the texture to the screen.

As described above, the system 100 for rendering the three-dimensional character of the present invention minimizes the render pass process using the GPGPU and performs irradiance processing, stretching processing, and final processing to process the realistic skin expressions in real time.

FIG. 3 is a flowchart illustrating a realistic skin rendering processing procedure of the three-dimensional character according to the present invention, FIG. 4 is a flowchart illustrating a processing procedure of a preprocessing routine illustrated in FIG. 3, FIG. 5 is a flowchart illustrating a processing procedure of a irradiance processing routine illustrated in FIG. 3, and FIG. 6 is a flowchart illustrating a processing procedure of a final processing routine illustrated in FIG. 3. The procedures are processed using the GPGPU as programs processed by the system 100 for rendering the three-dimensional character.

First, referring to FIG. 3, for rendering the realistic skin of the three-dimensional character, the system 100 for rendering the three-dimensional character of the present invention stretches a texture in a preprocessing process using the GPGPU module in step S200, creates and process the irradiance texture using the GPGPU module in step S230, and subsequently, processes the final texture using the GPGPU module in step S250.

Particularly, as illustrated in FIG. 4, the stretch processing routine S200 renders the facial texture of the three-dimensional model in the GPGPU module, that is, a first stretch butter StretchBuffer0 of the stretch GPU module 120 in step S202 and subsequently, repetitively processes the stretch U processing function and the stretch V processing function S1 in steps S204 to S218. In this case, the rending in the first stretch butter StretchBuffer0 means rendering a three dimensional coordinate to a two dimensional coordinate.

That is, in step S204, the stretch U shadow map function is processed using the first stretch buffer StretchBuffer0 as a source, and the result is output to the temporary buffer. In step S206, the texture stretched in the U-axial direction is processed using the temporary buffer as a source and the texture stretched in the V-axial direction is processed by the stretch V shadow function to be output to a second stretch buffer StretchBuffer1.

In step S208, the stretch U shadow map function is processed from the second stretch buffer StretchBuffer1, and the result is output to the temporary buffer. In step S210, the texture stretched in the U-axial direction is processed using the temporary buffer as a source and the texture stretched in the V-axial direction is processed by the stretch V shadow function to be output to a third stretch buffer StretchBuffer2.

In step S212, the stretch U shadow map function is processed from the third stretch buffer StretchBuffer2, and the result is output to the temporary buffer. In step S214, the texture stretched in the U-axial direction is processed using the temporary buffer as a source and the texture stretched in the V-axial direction is processed by the stretch V shadow function to be output to a fourth stretch buffer StretchBuffer3.

In step S216, the stretch U shadow map function is processed from the fourth stretch buffer StretchBuffer3 and the result is output to the temporary buffer. Subsequently, in step S218, the texture stretched in the U-axial direction is processed using the temporary buffer as a source and the texture stretched in the V-axial direction is processed by the stretch V shadow function to be output to a fifth stretch buffer StretchBuffer4.

Accordingly, in the stretch processing routine S200 in the exemplary embodiment, a portion that has been subjected to nine render passes for the stretch preprocessing in the conventional method is image-processed through one render pass S202 and four GPGPU functions, that is, the stretch processing functions S204 to S218, thereby reducing the load.

Further, as illustrated in FIG. 5, in the irradiance processing routine (S230), in step S232, the texture of the facial three-dimensional model is rendered into the GPGU module, that is, a screen buffer of the irradiance GPU module 110, and subsequently, in steps S234 to S244, the irradiance processing function and the stretching processing function S2 are repetitively processed many times.

Particularly, in step S234, the stretch U shadow map function is processed using the screen buffer and the first stretch buffer StretchBuffer0 as a source, and the result is output to the temporary buffer. In step S236, the stretch V shadow map function is processed using the temporary buffer and the first stretch buffer StretchBuffer0 as the source to be output to the first irradiance buffer (irradiance buffer 0). Thereafter, steps S234 and S236 are repeated many times. In the exemplary embodiment, steps S234 and S236 are repeated five times.

That is, in step S238, the stretch U shadow map function is processed using the first irradiance buffer (irradiance buffer 0) and the second stretch buffer StretchBuffer1 as a source, and the result is output to the temporary buffer. In step S240, the stretch V shadow map function is processed using the temporary buffer and the second stretch buffer StretchBuffer1 as the source to be output to a second irradiance buffer (irradiance buffer 1).

Thereafter, although not illustrated, the stretch U shadow map function and the stretch V shadow map function are respectively processed using the second to third irradiance buffers and the third to fourth stretch buffers sequentially as a source and the result is output to the temporary buffer, and as a result, the result is output to the third or fourth irradiance buffer.

In addition, in step S242, the stretch U shadow map function is processed using a fourth irradiance buffer (irradiance buffer 3) and a fifth stretch buffer StretchBuffer4 as a source, and the result is output to the temporary buffer. Subsequently, in step S244, the stretch V shadow map function is processed using the temporary buffer and the fifth stretch buffer StretchBuffer4 as the source and the result is output to a fifth irradiance buffer (irradiance buffer 4).

Therefore, in the irradiance processing routine S230 in the exemplary embodiment, an irradiance image of a portion that has been subjected to 11 render passes for the irradiance processing in the conventional method is created and processed through one render pass (S232) and five GPGPU functions, that is, irradiance processing functions S234 to S244 step by step, thereby reducing a load.

In addition, in the final processing routine S250, as illustrated in FIG. 6, the blur combining function is processed by applying gaussian blur to the irradiance image according to each step (S4), and the BRDF specular function is processed (S5). That is, in step S252, the irradiance images processed in the irradiance processing routine (S230) are received from the first to fifth stretch buffers StretchBuffer0 to StretchBuffer4 and linearly combined with each other, a final back texture FinalBackTexture is created through gaussian blur synthesis processing. In step S254, the final back texture FinalBackTexture is three-dimensionally mapped to the coordinates of the light using the BRDF specular function, and in step S256, the specular for the Fresnel effect is calculated. Subsequently, in step S258, the texture is mapped to the specular and the image coordinate system to create a final texture in which the final realistic skin is expressed.

Accordingly, in the final processing routine S250 of the exemplary embodiment, the operation on the final texture data is processed by interlocking with the GPGPU function. That is, in the final processing routine (S250), the gaussian blur for the irradiance image in each step is applied as the GPGPU function to exhibit the diffusion profile effect, and the BRDF specular effect is mapped to the final result image to create a texture in which the realistic skin is expressed.

Subsequently, FIG. 7 is a block diagram illustrating a configuration of a system for rendering a three-dimensional character by a parallel processing method according to another exemplary embodiment of the present invention.

Referring to FIG. 7, a system 300 for rendering a three-dimensional character of the exemplary embodiment includes a plurality of realistic skin processing modules 310 that renders images for the facial skin of the three-dimensional character using the GPGPU for realistic skin expressions for a plurality of three-dimensional characters included in contents and parallel-processes the plurality of three-dimensional characters.

To this end, the system 300 for rendering the three-dimensional character of the exemplary embodiment includes a plurality of realistic skin processing modules 310 and a thread pool monitor 330.

Particularly, the realistic skin processing module 310 renders the realistic skin of each of the three-dimensional characters included in the contents using the GPGPU to be expressed. The realistic skin processing module 310 includes the components 312 to 316 of FIG. 2 and a thread recognizer 318 for recognizing a thread pool for the realistic skin processing module 310. That is, the realistic skin treatment module 310 includes a plurality of irradiance GPU modules 312 that processes the irradiance for realistic skin expressions, a stretch GPU module 314, a final GPU module 316, and a thread recognizer 318. In the exemplary embodiment, the irradiance GPU modules 312, the stretch GPU module 314, and the final GPU module 316 are the same as or almost similar to the functions and configurations of the modules 110, 120, and 130 illustrated in FIG. 2, respectively, and thus, the detailed description thereof will be omitted.

First, the thread is a unit of a flow that is executed in any program, especially a process, and the use of two or more threads in a process is referred to as a multi-thread. The simplest method among methods for processing the operation using the thread is to create one thread to process the operation and then remove the thread. This method uses only one thread per operation and is called a thread per request (TPR). In the TPR, as the operation amount increases, the time for creating and removing the threads for processing increases and thus, the time for performing the operation is relatively reduced.

Accordingly, there is a problem that the throughput is reduced, and in order to solve the problem, a thread pool method is used. The thread pool method may reduce the overhead of creating and deleting threads by waiting the finished threads without removing and making the thread available for the next operation.

The thread pool method is a method used when the operation frequently occurs and the processing time is short, and a predetermined number of threads are maintained for reducing the creation and the deletion of the threads, and the threads repeat performing and waiting the operation and the operation is processed. In the thread pool method, compared to the conventional TPR method using one thread per operation, the overhead due to the creation and deletion of the threads is reduced and the time for performing the operation is shorter, and the throughput is increased. That is, in the conventional TPR, as the operation amount increases, the time for creating and removing the threads for processing increases and thus, the time for performing the operation is relatively reduced.

Therefore, the realistic skin processing module 310 processes a thread pool for the GPGPU module of each realistic skin RealSkin unit. Accordingly, the thread recognizer 318 has a recognizer for recognizing the thread pool for each realistic skin processing module 310 from the thread pool monitor 330. The realistic skin processing module 310 sets a flag for an operation for processing the realistic skin expressions of each user, and provides a normal operation state to the thread pool monitor 330 in real time.

In addition, the thread pool monitor 330 manages the thread pool for the realistic skin processing modules 310 to process signals from each of the realistic skin processing modules 310. The thread pool monitor 330 detects a response from the GPGPU function for each character and determines that the realistic skin processing modules 310 may not be applied and operated when there is a limit value that the realistic skin processing module 310 for the realistic skin is no longer allocated to notify the situation to the application.

In addition, FIG. 8 is a flowchart illustrating a processing procedure of realistic skin rendering of a three-dimensional character by a parallel processing method according to another exemplary embodiment of the present invention. This procedure is processed by the system 300 for rendering the three-dimensional character of FIG. 7.

Referring to FIG. 8, the system 300 for rendering the three-dimensional character starts and activates the threshold pool monitor 330 in step S400, and creates a thread pool for the realistic skin processing module 310 in step S402. In step S404, a thread recognizer is allocated to each of the realistic skin processing modules 310. In step S406, resources of the realistic skin processing modules 310 are initialized. In step S408, the thread pool monitor 330 notifies output starting to the threads of the realistic skin processing modules 310.

In step S410, the thread pool monitor 330 monitors thread pool signals for the respective realistic skin processing modules 310. In step S412, the thread pool monitor 330 recognizes an update state for the final texture of each of the realistic skin processing modules 310.

In step S414, the threshold pool monitor 330 determines the presence or absence of a thread signal from each of the realistic skin processing modules 310 in order to determine the normal operation state of the realistic skin processing module 310. As the determining result, if there is no thread signal, the procedure is progressed in step S416 to notify to the application that an error has occurred. However, if there is the thread signal, it means that the thread is operating normally. Therefore, the procedure is progressed in step S418 to process the rendering process, that is, the render pass of the final content, and then the final content is output to the screen in step S420.

As described above, the configurations and the actions of the system for rendering the three-dimensional character are illustrated in the detailed description and the drawings, but it is to be understood that the present invention is not limited to these embodiments, and various changes and modifications may be made without departing from the spirit of the present invention.

The invention claimed is:

1. A system for rendering a plurality of three-dimensional characters that parallel-processes rendering for the plurality of three-dimensional characters, the system comprising:
   a plurality of realistic skin processing modules that renders images for skin of each of the plurality of three-dimensional characters using a general purpose graphic processing unit (GPGPU), has a thread recognizer for recognizing a thread pool, and processes the thread pool; and
   a thread pool monitor that recognizes the thread recognizer from the plurality of realistic skin processing modules to manage the thread pool for the plurality of realistic skin processing modules,
   wherein the thread pool monitor detects a response from a GPGPU function for each of the plurality of three-dimensional characters processed by each of the plurality of realistic skin processing modules and determines that at least one realistic skin processing module may not be applied and operated based on a limit value such that the at least one realistic skin processing module is no longer allocated and to notify a state of the at least one realistic processing module to an application.

2. The system of claim 1, wherein each of the plurality of realistic skin processing modules includes:
- a plurality of irradiance GPU modules that create irradiance textures according to a skin layer in a three-dimensional character model to sequentially blur-process the irradiance textures;
- a stretch GPU module that creates image data stretched by mapping screen coordinates and image coordinates and creates a stretch shadow map by pre-processing to preprocess the irradiance textures to be blurred in each of the plurality of irradiance GPU modules; and
- a final GPU module that receives the irradiance textures from the plurality of irradiance GPU modules and linearly combines the irradiance textures together, and sequentially processes a blur synthesis function, a specular function, and a back texture copy to create and output a final texture.

3. A method for processing a system for rendering a three-dimensional character, the method comprising steps of:
- creating a thread pool for each of a plurality of realistic skin processing modules by activating a thread pool monitor of the system for rendering the three-dimensional character;
- allocating a thread recognizer for each of the plurality of realistic skin processing modules;
- initializing resources of the plurality of realistic skin processing modules;
- notifying, by the thread pool monitor, output for starting the thread pool for each of the plurality of realistic skin processing modules;
- monitoring, by the thread pool monitor, a thread pool signal for each of the plurality of realistic skin processing modules;
- recognizing, by the thread pool monitor, an update state for a final texture of each of the plurality of realistic skin processing modules;
- determining, by the thread pool monitor, a presence or absence of a thread signal from each of the plurality of realistic skin processing modules in order to determine a normal operation state for each of the plurality of realistic skin processing modules; and
- as a result of the determining, if there is the presence of the thread signal from each of the plurality of realistic skin processing modules, processing and outputting a render pass of final content from the final texture of each of the plurality of realistic skin processing modules.

4. The method of claim 3, further comprising:
- as the result of the determining, if there is the absence of the thread signal from each of the plurality of realistic skin processing modules, notifying an application that an error occurs.

* * * * *